(12) United States Patent
Pearson et al.

(10) Patent No.: US 10,860,724 B2
(45) Date of Patent: Dec. 8, 2020

(54) ACTIVE KEY ROLLING FOR SENSITIVE DATA PROTECTION

(71) Applicant: Microsoft Technology Licensing, LLC, Redmond, WA (US)

(72) Inventors: Malcolm Eric Pearson, Kirkland, WA (US); Tolga Acar, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 15/621,562

(22) Filed: Jun. 13, 2017

(65) Prior Publication Data
US 2018/0357426 A1    Dec. 13, 2018

(51) Int. Cl.
*G06F 21/00*    (2013.01)
*G06F 21/60*    (2013.01)
*H04L 29/06*    (2006.01)
*G06F 21/62*    (2013.01)
*G06Q 20/38*    (2012.01)

(52) U.S. Cl.
CPC ........... *G06F 21/602* (2013.01); *G06F 21/60* (2013.01); *G06F 21/6218* (2013.01); *G06F 21/6254* (2013.01); *G06Q 20/382* (2013.01); *H04L 63/06* (2013.01); *H04L 63/04* (2013.01)

(58) Field of Classification Search
CPC .... G06F 21/602; G06F 21/6218; G06F 21/60; G06F 21/6254; H04L 63/06; H04L 63/04; G06Q 20/382
See application file for complete search history.

(56) References Cited

U.S. PATENT DOCUMENTS 5,915,025 A * 6/1999 Taguchi ............... G06F 12/145
                                                            380/44
5,943,423 A    8/1999 Muftic
(Continued)

FOREIGN PATENT DOCUMENTS

WO    2006078572 A2    7/2006

OTHER PUBLICATIONS

"International Search Report and Written Opinion Issued in PCT Application No. PCT/US2018/035425", dated Aug. 1, 2018, 11 pages.
(Continued)

*Primary Examiner* — Don G Zhao
(74) *Attorney, Agent, or Firm* — Fiala & Weaver P.L.L.C.

(57) ABSTRACT

In aspects of active key rolling for sensitive data protection, a data security system includes memory storage implemented as a data store to maintain a batch of sensitive data instruments each encrypted with a previous encryption key. A data encryption service can receive a request from a client device for data in a sensitive data instrument from the batch of the sensitive data instruments. The data encryption service can decrypt the sensitive data instrument with the previous encryption key making the requested data in the sensitive data instrument available for access by the client device. The data encryption service can then re-encrypt the sensitive data instrument with a new encryption key effective to update the encryption of the sensitive data instrument, the updated encryption being triggered based on the request for the data and the decryption of the sensitive data instrument.

20 Claims, 5 Drawing Sheets

(56) References Cited

U.S. PATENT DOCUMENTS

| | | | |
|---|---|---|---|
| 7,971,070 B2* | 6/2011 | Lotspiech | G11B 20/00086 380/201 |
| 8,099,607 B2* | 1/2012 | Sandhu | H04L 9/302 380/277 |
| 8,327,422 B1 | 12/2012 | Friedman et al. | |
| 9,037,870 B1 | 5/2015 | Zheng et al. | |
| 9,722,974 B1* | 8/2017 | Fuller | H04L 63/0428 |
| 10,454,679 B2* | 10/2019 | Tamura | G06F 16/164 |
| 10,462,111 B2* | 10/2019 | Frankel | H04L 9/3297 |
| 10,592,679 B2* | 3/2020 | Tamura | H04L 9/088 |
| 2003/0182142 A1* | 9/2003 | Valenzuela | H04N 21/83555 705/1.1 |
| 2007/0297610 A1* | 12/2007 | Chen | H04L 9/0822 380/270 |
| 2009/0022320 A1* | 1/2009 | Furukawa | G06F 21/10 380/278 |
| 2009/0225987 A1* | 9/2009 | Metzger | H04L 9/12 380/278 |
| 2010/0199088 A1* | 8/2010 | Nath | G06F 21/6218 713/167 |
| 2011/0055585 A1 | 3/2011 | Lee | |
| 2011/0107203 A1* | 5/2011 | Nash | G06F 17/248 715/243 |
| 2012/0159191 A1* | 6/2012 | Vainstein | G06F 21/6209 713/189 |
| 2012/0321078 A1* | 12/2012 | Chambers | H04L 9/0891 380/44 |
| 2013/0070925 A1* | 3/2013 | Yamada | H04L 9/08 380/255 |
| 2014/0129844 A1* | 5/2014 | Johnson | G06F 21/78 713/189 |
| 2015/0312038 A1* | 10/2015 | Palanisamy | H04L 9/3213 713/155 |
| 2015/0318986 A1* | 11/2015 | Novak | G06F 21/6209 713/189 |
| 2016/0149899 A1 | 5/2016 | Abbott | |
| 2016/0321460 A1 | 11/2016 | Suter et al. | |
| 2016/0335453 A1* | 11/2016 | Kounga | G06F 21/6245 |
| 2017/0011394 A1* | 1/2017 | Kumar | G06Q 20/401 |
| 2017/0039568 A1* | 2/2017 | Tunnell | G06Q 20/4014 |
| 2017/0359174 A1* | 12/2017 | Tamura | G06F 21/6218 |
| 2017/0359358 A1* | 12/2017 | Alattar | G06Q 20/12 |
| 2018/0048631 A1* | 2/2018 | Waltermann | H04L 63/0428 |
| 2019/0122191 A1* | 4/2019 | Filipiak | H04L 9/3213 |

OTHER PUBLICATIONS

What is Tokenization? | Tokenization 101 | TokenEx; Published 2016 https://tokenex.com/resource-center/what-is-tokenization/.

* cited by examiner

ACTIVE KEY ROLLING FOR SENSITIVE DATA PROTECTION

BACKGROUND

Payment and financial instrument numbers and associated information, such as for credit cards and bank accounts, are typically stored encrypted using an encryption key in an effort to protect against the credit card numbers being stolen and unauthorized bank account access. Although credit cards and bank accounts should be treated as sensitive and protected data, they are often susceptible to attack because of the continued exposure as consumers often use credit cards and/or bank accounts to purchase goods and services, particularly for on-line purchases. Additionally, many on-line merchants hold payment information on file so that a returning customer does not have to re-enter the information. Similarly, payment processing services maintain customer payment information in the form of credit cards and/or bank account information, and the payment information can be accessed by a merchant multiple times to complete purchase transactions. The overall security model for payment and financial instruments, such as credit cards and bank accounts, is an ongoing challenge to protect the sensitive data, yet allow consumers to easily use the payment and financial instruments when interacting with both in-person and on-line merchants.

The financial instruments eco-system includes credit card number and bank account number vaults, commonly referred to as card vaults or token service providers, which are typically operated as third-party services to off-load the numbers and associated information for payment and financial instruments from on-line merchants. These card vaults or token service providers can receive a credit card number from an on-line merchant, and in exchange, provide an undecipherable token as a placeholder that is associated with the credit card number, but has no intrinsic value and is not usable as a payment instrument in the event that it becomes compromised. Additionally, the original payment information can be encrypted with an encryption key and stored securely, yet be available to an on-line merchant for payment processing when a return customer initiates payment with the same previously-stored credit card or bank account number.

An industry-designated practice is to "roll" the encryption keys that are used to encrypt the payment and financial instrument numbers, such as to update the encryption keys every year or two. However, the current mechanism for key rolling is a laborious manual process, prone to errors, and is very time-consuming for those involved to take the entire payment system off-line and update the encryption keys to initiate re-encrypting and re-hashing the protected payment and financial instrument numbers. Taking the payment system off-line results in service outages and failures at merchant sites attempting to process payment information. Subsequent manual intervention of background tasks and temporary processing is error-prone. More significantly, the process of credit card tokenization using the long-term year or two cryptographic keys is not a true tokenization, and allows vulnerabilities that may lead to compromising the encryption keys. Additionally, the integrity and confidentiality of the encryption keys when tokenization is performed outside of a secure system is extremely difficult to guarantee, even when public key encryption is utilized. If a master encryption key is compromised, many thousands of payment and financial instrument numbers may be accessed and stolen over the long-term period between the manual key rolling events.

SUMMARY

This Summary introduces features and concepts of active key rolling for sensitive data protection, which is further described below in the Detailed Description and/or shown in the Figures. This Summary should not be considered to describe essential features of the claimed subject matter, nor used to determine or limit the scope of the claimed subject matter.

Active key rolling for sensitive data protection is described. In aspects, a data security system includes memory storage implemented as a data store to maintain a batch of sensitive data instruments each encrypted with a previous encryption key. A data encryption service can receive a request from a client device for data in a sensitive data instrument from the batch of the sensitive data instruments. The sensitive data instrument may be a transaction instrument and the client device requests access to the data to initiate transaction processing. The data encryption service can decrypt the sensitive data instrument with the previous encryption key making the requested data in the sensitive data instrument available for access by the client device. The data encryption service can then re-encrypt the sensitive data instrument with a new encryption key effective to update the encryption of the sensitive data instrument. The updated encryption of the sensitive data instrument is triggered based on the request for the data and the decryption of the sensitive data instrument. The data security system includes a key service that periodically generates encryption keys usable to re-encrypt one or more of the sensitive data instruments in the batch of the sensitive data instruments with a latest generated encryption key as the sensitive data instruments are decrypted responsive to a data access request for a respective sensitive data instrument.

In other aspects of active key rolling for sensitive data protection, the sensitive data instruments in the batch of the sensitive data instruments remain encrypted with the previous encryption key after the sensitive data instrument is decrypted and re-encrypted with the new encryption key. Additionally, the re-encrypted sensitive data instrument is maintained in the data store in a new batch of sensitive data instruments that are each encrypted with the new encryption key. The data encryption service can initiate propagation of the re-encrypted sensitive data instrument to multiple data security systems, and then delete the sensitive data instrument that was encrypted with the previous encryption key from the multiple data security systems. Additionally, the key service can delete the previous encryption key after a designated period of time effective to eliminate access to the sensitive data instruments in the batch of the sensitive data instruments. The data encryption service can also delete the batch of the sensitive data instruments after a designated period of time effective to delete the sensitive data instruments that were each encrypted with the previous encryption key.

In other aspects of active key rolling for sensitive data protection, the encryption keys can be periodically-generated by the key service, and each new encryption key is usable to tokenize one or more sensitive data instruments. The data encryption service at the data security system can receive a request from a client device to tokenize a sensitive data instrument, and then communicate an ephemeral token of the latest generated encryption key to the client device for use to tokenize the sensitive data instrument. The data encryption service can then receive the tokenized sensitive data instrument from the client device and temporarily maintain the tokenized sensitive data instrument for a short time duration. For example, the tokenized sensitive data instrument may be a transaction instrument that is available for access with the ephemeral token by the client device to initiate transaction processing for the short time duration.

BRIEF DESCRIPTION OF THE DRAWINGS

Aspects of active key rolling for sensitive data protection are described with reference to the following Figures. The same numbers may be used throughout to reference like features and components that are shown in the Figures.

DETAILED DESCRIPTION

Aspects of active key rolling for sensitive data protection are described, and features provide a system for automated encryption key generation, as well as automated re-encryption of sensitive data instruments. The described features eliminate the onerous, manual key-rolling process for updating the encryption keys of payment and financial instrument numbers, such as for credit cards and bank accounts. The described features also automate the re-encryption and re-hashing process, while improving payment instrument security utilizing tokenization with ephemeral tokens and active encryption key rolling while the overall financial system remains on-line and operational. The techniques of active key rolling for sensitive data protection are described in the context of encryption, utilizing encryption keys and tokenization, but are equally applicable to other cryptographic operations, such as for keyed hashing and signatures.

While features and concepts of active key rolling for sensitive data protection can be implemented in any number of different devices, systems, networks, environments, and/or configurations, aspects of active key rolling for sensitive data protection are described in the context of the following example devices, systems, and methods.

Figure 1:
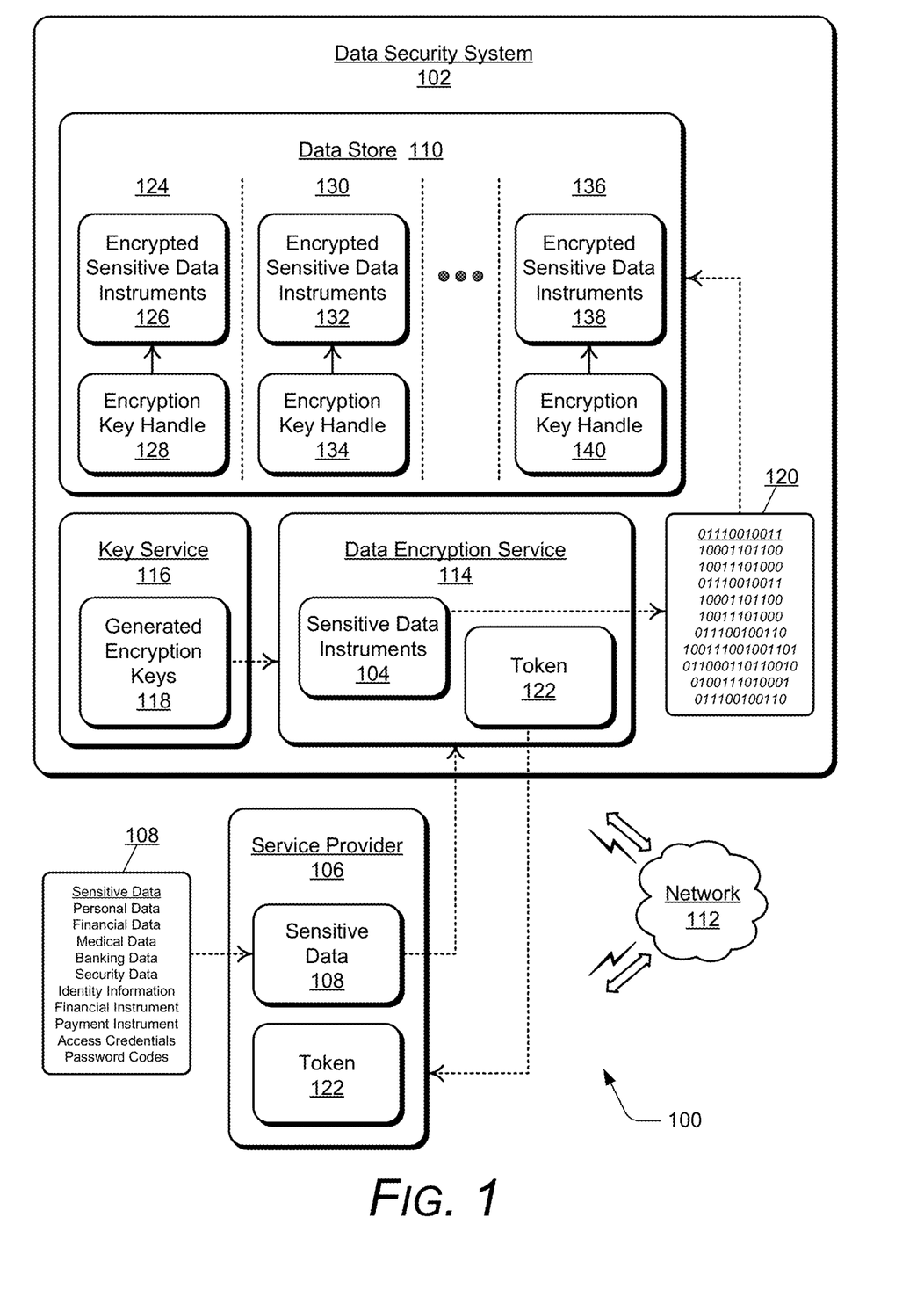
FIG. 1 illustrates an example sensitive data protection system in which aspects of active key rolling for sensitive data protection can be implemented.

FIG. 1 illustrates an example sensitive data protection system 100 in which aspects of active key rolling for sensitive data protection can be implemented. The example system 100 includes a data security system 102, which is representative of any number of cloud-based, sensitive data protection sites that may be used to maintain, encrypt, and/or tokenize sensitive data instruments 104, such as received for protected safe-keeping from companies, individuals, on-line merchants, and the like. The sensitive data instruments 104 may include sensitive numbers and associated information for any type of payment and financial instruments, such as for credit cards and bank accounts, that on-line merchants upload to the data security system 102. Additionally, the sensitive data instruments 104 may include personal identity information and medical records that health services companies upload for safe-keeping at the data security system 102. Further, the sensitive data instruments 104 may include any other type of personal, financial, banking, and security data, as well as computer access credentials, such as username and password pairs.

The example sensitive data protection system 100 includes a service provider 106, which is representative of an entity that receives and uploads sensitive data 108 to the data security system 102 as the sensitive data instruments 104. For example, a medical service provider may upload patient personal data and medical records as the sensitive data 108, which is received by the data security system 102 as the sensitive data instruments 104. Similarly, an on-line merchant may upload a payment instrument, such as a credit card number or bank account number, as the sensitive data 108, which is received by the data security system 102 as a sensitive data instrument 104.

The data security system 102 includes a data store 110 that may be implemented as any suitable memory, memory device, or electronic data storage for sensitive data and/or network-based data storage. The data store 110 is utilized at the data security system 102 to maintain encrypted sensitive data instruments and associated encryption key handles as further described below. Although not shown, the data security system 102 can include one or more hardware server devices (e.g., computing devices) that may be implemented at the data security system and/or may be implemented as a distributed computing and data security system. Generally, the server computing devices of the data security system 102 include memory and a processor, and may include any number and combination of different components as further described with reference to the example device shown in FIG. 5. For example, a server computing device of the data security system 102 can include one or more communication systems for communication with the service provider 106, or service providers, via a network 112. Similarly, the service provider 106 can be implemented as one or more computing devices that include memory and a processing system, and may include any number and combination of different components as further described with reference to the example device shown in FIG. 5.

The data security system 102 and the service provider 106, as well as any of the computing devices, server devices, and/or services described herein can communicate via the network 112, such as for data communication between the data security system 102 and the service provider 106. The network 112 can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In this example, the data security system 102 implements a data encryption service 114 and a key service 116 as software applications or modules, such as executable software instructions (e.g., computer-executable instructions) that are executable with a processing system of a server computing device to implement the techniques of active key rolling for sensitive data protection. The data encryption service 114 and the key service 116 can be stored on computer-readable storage media, such as any suitable memory device (e.g., the data store 110) or electronic data storage implemented at the data security system 102. Although shown and described as software applications or modules of the data security system 102, the data encryption service 114 and/or the key service 116 may be implemented as independent components or applications in the sensitive data protection system 100, such as by other third-party service providers that communicate with the data security system 102 via the network 112. Further, although shown and described as separate software applications or modules, the data encryption service 114 and the key service 116 may be integrated as a single application of the data security system 102, or implemented together by a third-party service provider.

In aspects of active key rolling for sensitive data protection, the key service 116 is implemented to periodically generate new encryption keys 118, and each new encryption key 118 is usable to encrypt one or more of the sensitive data instruments 104 with a latest generated encryption key. As further described with reference to FIG. 2, each new encryption key 118 is also usable to tokenize one or more of the sensitive data instruments 104 with a latest generated encryption key. In the current example, the data encryption service 114 can receive the sensitive data 108 from the service provider 106 as a sensitive data instrument 104, and then encrypt the sensitive data instrument 104 with a new encryption key 118 that is generated by the key service 116 to generate an encrypted sensitive data instrument 120.

The data security system 102 can also communicate a token 122 to the service provider 106 that uploaded the sensitive data instrument 104 for encryption and safe-keeping as protected data at the data security system. The service provider 106 can receive the token 122 from the data encryption service 114, and maintain the token 122 for future use to request access to the data in the corresponding encrypted sensitive data instrument 120 that is maintained in the data store 110 at the data security system 102. The tokenization swaps out the sensitive data 108 for the token 122 at the service provider 106, such as to replace a credit card or bank account number with the token randomized number. The token 122 is an undecipherable placeholder that is associated with sensitive data 108, such as a credit card number or bank account number, but has no intrinsic value and is not usable as a payment instrument in the event that it becomes compromised.

In this instance, the token 122 is a multi-use token for repeat transactions, such as for a credit card number of a repeat customer to the service provider 106. The token 122 correlates to the encrypted sensitive data instrument 120 that is stored in the data store 110 at the data security system 102 for recurring transactions. The service provider 106 can utilize the token 122 to request data (e.g., the original sensitive data 108) in the encrypted sensitive data instrument 120 from the data security system 102. For example, a medical service provider may use the token 122 to request access to encrypted medical records that are stored and maintained in the data store 110 of the data security system 102. Alternatively or in addition, the service provider 106 can utilize the token 122 to initiate transaction processing at the data security system 102 and/or via an independent third-party service that processes payment transactions.

In the current example, the data encryption service 114 can receive the sensitive data 108 from the service provider 106 as a sensitive data instrument 104, and then encrypt the sensitive data instrument 104 with a new encryption key 118 that is generated by the key service 116 to generate an encrypted sensitive data instrument 120. The encrypted sensitive data instrument 120 is then stored in the data store 110, which maintains the encrypted sensitive data instrument 120 in a batch 124 of encrypted sensitive data instruments 126, along with an encryption key handle 128 of the particular encryption key used by the data encryption service 114 to encrypt the sensitive data instruments in the batch 124 of encrypted sensitive data instruments 126. The encryption key handle 128 can be implemented as a textual name and version number so as to correlate to the generated encryption key 118 that is used to encrypt the sensitive data instruments in the batch 124 of encrypted sensitive data instruments.

As noted above, the data encryption service 114 at the data security system 102 may receive a request from the service provider 106 for data in a previously-encrypted sensitive data instrument in the batch 124 of the sensitive data instruments 126. The data encryption service 114 can use the encryption key handle 128 to request the corresponding encryption key 118, and then use the requested previous encryption key to decrypt the previously-encrypted sensitive data instrument that corresponds with the requested data in the batch 124 of the sensitive data instruments 126. The requested data in the previously-encrypted sensitive data instrument is then available for access by the service provider 106, or to initiate transaction processing, such as to initiate a payment transaction that may be handled by a third-party payment processor on behalf of the service provider.

In aspects of active key rolling for sensitive data protection, the data encryption service 114 can then re-encrypt the sensitive data instrument 120 with a new encryption key 118 (e.g., the latest generated encryption key), which updates the encryption of the sensitive data instrument. The updated encryption of the sensitive data instrument 120 is triggered based on the request for the data from the service provider 106, and based on the subsequent decryption of the sensitive data instrument. Rather than waiting to re-encrypt all of the encrypted sensitive data instruments 126 in the batch 124 of the encrypted sensitive data instruments, the encryption key generation and re-encryption is ongoing, using a time-series of the encryption keys 118 as they are generated by the key service 116.

The re-encrypted sensitive data instrument 120 that is encrypted with the latest generated encryption key 118 is then stored in the data store 110 and maintained in a new batch 130 of encrypted sensitive data instruments 132, along with an encryption key handle 134 of the particular latest generated encryption key used by the data encryption service 114 to encrypt the sensitive data instruments in the batch 130 of the encrypted sensitive data instruments 132. Additionally, a copy of the previously-encrypted sensitive data instrument remains encrypted with the previous encryption key, which is identified by the encryption key handle 128, and is maintained in the data store 110 in the batch 124 of the encrypted sensitive data instruments 126 that have been encrypted with the previous encryption key. Similarly, the service provider 106 may again request access to the sensitive data in the encrypted sensitive data instrument 120, in which case the data encryption service 114 can use the encryption key handle 134 to request the corresponding encryption key 118, and then use the requested previous encryption key to decrypt the requested sensitive data instrument from the batch 130 of the encrypted sensitive data instruments 132.

The data encryption service 114 can then re-encrypt the sensitive data instrument 120 again with a new encryption key 118 (e.g., the latest generated encryption key), which updates the encryption of the sensitive data instrument. The re-encrypted sensitive data instrument 120 that is encrypted with the latest generated encryption key 118 is then stored in the data store 110 and maintained in a new batch 136 of encrypted sensitive data instruments 138, along with an encryption key handle 140 of the particular latest generated encryption key used by the data encryption service 114 to encrypt the sensitive data instruments in the batch 136 of the encrypted sensitive data instruments 138. As noted above, a copy of the previously-encrypted sensitive data instrument remains encrypted with the previous encryption key, which is identified by the encryption key handle 128, and is maintained in the batch 124 of the encrypted sensitive data instruments 126 that have been encrypted with the previous encryption key. Similarly, a copy of the previously-encrypted sensitive data instrument remains encrypted with the previous encryption key, which is identified by the encryption key handle 134, and is also maintained in the batch 130 of the encrypted sensitive data instruments 132 that have been encrypted with the previous encryption key.

In a distributed environment for sensitive data protection, the data encryption service 114 can initiate propagation of the encrypted (and subsequent re-encrypted) sensitive data instruments to multiple data security systems, such as in a financial instruments eco-system or environment of card vaults and token service providers. In keeping with the techniques for active key rolling as described herein, the key service 116 can delete the previous encryption key, which is identified by the encryption key handle 128, after a designated period of time to eliminate access to the encrypted sensitive data instruments 126 in the batch 124 of the encrypted sensitive data instruments. The designated period of time after which the previous encryption key is deleted can be after the re-encrypted sensitive data instrument that is encrypted with the latest encryption key 118 is propagated to the multiple data security systems in the distributed environment for sensitive data protection.

Alternatively or in addition, the data encryption service 114 can delete the batch 124 of the encrypted sensitive data instruments 126 after a designated period of time to delete the encrypted sensitive data instruments that were each encrypted with the previous encryption key, which is identified by the encryption key handle 128. Similarly, the designated period of time after which the batch 124 of the previously-encrypted sensitive data instruments is deleted can be after the re-encrypted sensitive data instrument that is encrypted with the latest encryption key 118 is propagated to the multiple data security systems in the distributed environment for sensitive data protection.

The encryption key generation is ongoing, using a time-series of the encryption keys 118 as they are generated by the key service, such as during runtime of the system. Multiple dormant encryption keys can be generated and ready to use for encryption and tokenization, such as across the nodes in a distributed system of a financial instruments eco-system or environment of card vaults and token service providers. The new encryption keys 118 can be generated and held in a dormant state in advance of being distributed to the nodes of the system prior to activating the encryption keys for active use. Active encryption keys are then transitioned to a read-only state just after a new encryption key is made active, and the encryption key remains in the read-only state for detokenization, but is not used to create new tokens. The encryption key can be maintained in the read-only state as long as there are valid tokens associated with that encryption key. To prevent infinite key longevity, each token has a limited lifetime, and it is this lifetime that determines when a read-only key is permanently deleted.

The data security systems 102 in a distributed system can initiate the key service 116 (or respective key services at each data security system) to generate the encryption keys 118 to initialize queues of dormant generated encryption keys. Each data security system in the overall environment can independently generate the encryption keys 118 with a key service as needed, and each encryption key can include a key generation timestamp ($T_G$) and a maximum token duration time ($D_T$). The encryption key state changes do not need to be synchronized across the data security system servers, but rather each node (e.g., each data security system 102) transitions an encryption key 118 from one state to the next independent of the other nodes in the overall system. This is a push-forward model of state transitions, from dormant-to-active, active-to-readonly, and readonly-to-deletion. In the dormant-to-active transition, an encryption key 118 transitions to the active state after the dormant duration time ($D_D$) measured from the key generation time ($T_G$) in the dormant state, and the key is assigned an active start timestamp ($T_A$). In the active-to-readonly transition, the active encryption key 118 transitions to the readonly state when a new encryption key transitions into the active state, and the encryption key is assigned a read-only start timestamp ($T_R$). In the readonly-to-deletion transition, the encryption key 118 is deleted after the token duration time ($D_T$) plus a margin ($D_M$) in the readonly state. The margin ($D_M$) accounts for timer wake-up granularity and clock at each node of the system.

Generally, there is at least one encryption key 118 associated with an encryption key handle in each server partition (e.g., of the data store 110). Prior to the expiration of a currently active encryption key, the key service 116 can generate a new encryption key 118. As each encryption key 118 expires, it is transitioned to an inactive state, meaning that it won't be used to encrypt new incoming sensitive data, but will be used to service decryption (detokenization) requests in the readonly state of operation. Each of the encryption keys 118 in the readonly state of operation has a limited lifetime end, of which an encryption key is simply deleted by the key service 116. Subsequent decryption requests will appear as request failures, but in fact, are not failures due to the intended operation of active key rolling, which inherently contributes to the lifetime of a token. The concept of active key rolling for sensitive data protection utilizes multiple simultaneous encryption keys in two sliding windows of time, as generally described above. The first time window is the set of encryption keys and the second time window is the set of decryption keys.

Figure 2:
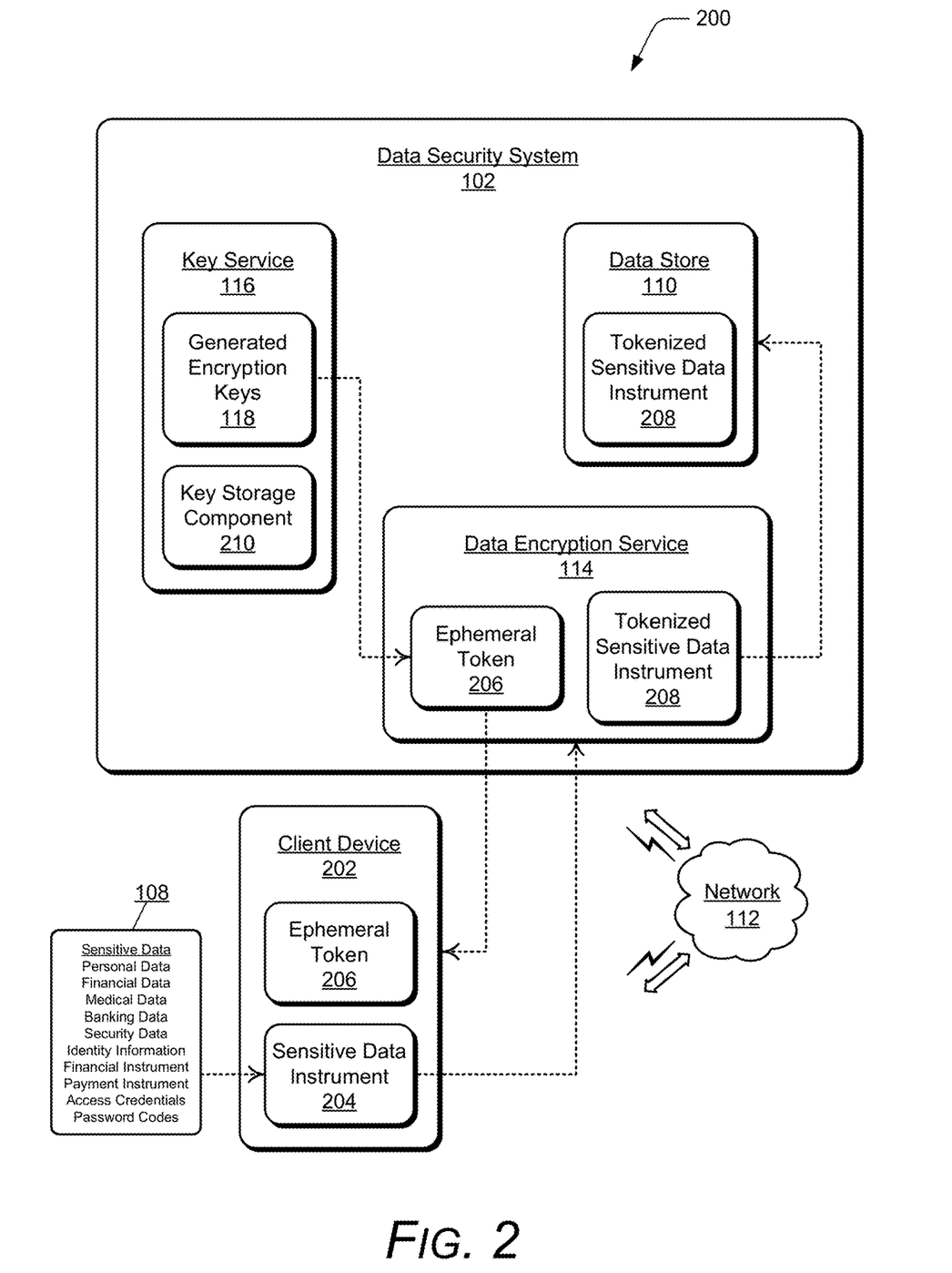
FIG. 2 further illustrates an example of the sensitive data protection system in which aspects of active key rolling for sensitive data protection can be implemented.

FIG. 2 further illustrates an example 200 of the sensitive data protection system in which aspects of active key rolling for sensitive data protection can be implemented, as shown and described with reference to FIG. 1. The example 200 includes the data security system 102, with the data store 110, the data encryption service 114, and the key service 116. The example 200 of the sensitive data protection system also includes a client device 202, which is representative of any type of a computing device that is implemented for data communication with the data security system 102 via the network 112. For example, the client device 202 can include a mobile device, computing device, mobile phone, tablet, communication, entertainment, gaming, media playback, and/or other type of device. Generally as a computing device, the client device 202 includes memory and a processor, and may include any number and combination of different components as further described with reference to the example device shown in FIG. 5.

Similar to the service provider 106 described with reference to FIG. 1, the client device 202 is an entity that receives sensitive data 108, such as input by a user of the client device 202. For example, a user of the client device 202 may input a credit card number or a bank account number as a sensitive data instrument 204, which the client device then uploads to the data security system 102. However, for security of the sensitive data 108 in the sensitive data instrument 204, the client device 202 can request to tokenize and/or encrypt the sensitive data instrument before upload. The data encryption service 114 of the data security system 102 can receive the request from the client device 202 to tokenize the sensitive data instrument 204 at the client device.

The key service 116 of the data security system 102 periodically generates the new encryption keys 118, and each new encryption key 118 is usable to tokenize one or more of sensitive data instruments with a latest generated encryption key. The encryption keys 118 are maintained and stored by the key service 116, which also generates and retires the encryption keys. The key service 116 can include a key storage component 210, which may utilize local storage media such as hard disks local to the key service, or the key service may utilize specialized hardware devices such as hardware security modules (HSM) to store the generated encryption keys 118. In order to perform any cryptographic operation, such as encryption, decryption, tokenization, and detokenization, the data encryption service 114 can initiate a call to the key service 116 for use of an encryption key 118 that is stored in the key storage component 210. In practice, only the key service 116 has access to the cryptographic keys in cleartext, and the other services (e.g., the data encryption service 114) refers to the cryptographic keys by the associated encryption key handles, which may be implemented as a textual name and a version number.

In the example of the data encryption service 114 receiving a request from the client device 202 to tokenize the sensitive data instrument 204 at the client device, the data security system 102 communicates an ephemeral token 206 of a latest generated encryption key 118 to the client device 202 for use at the client device to tokenize the sensitive data instrument 204. The data encryption service 114 can then receive the tokenized sensitive data instrument 208 from the client device 202. The data security system 102 then temporarily maintains the tokenized sensitive data instrument 208, such as with the data store 110 for a short time duration. As described, the tokenized sensitive data instrument 208 may be a transaction instrument that is available for access with the ephemeral token 206 by the client device 202 to initiate transaction processing for the short time duration.

The tokenization can be used to encrypt the sensitive data 108 with an ephemeral cryptographic key (e.g., ephemeral token 206) without saving the encryption key in persisted storage (e.g., the encryption keys are not stored in the data store 110). The lifetime of the ephemeral token 206 is constrained by the lifetime of the generated encryption key 118, which can be any designated time duration, such as minutes, hours, days, etc. The lack of persisted key storage suffices to remove the possibility of unauthorized access to disk and/or backup data storage. Further, the ongoing encryption key generation by the key service 116 thwarts scalable attacks in the event that an encryption key is compromised by reducing the exposure of large amounts of sensitive data. The possible compromise scale reduction is also applicable in the event of a cryptographic compromise, which would impact only a small subset of the sensitive data that is protected by a single compromised key.

Example methods 300 and 400 are described with reference to respective FIGS. 3 and 4 in accordance with one or more aspects of active key rolling for sensitive data protection. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
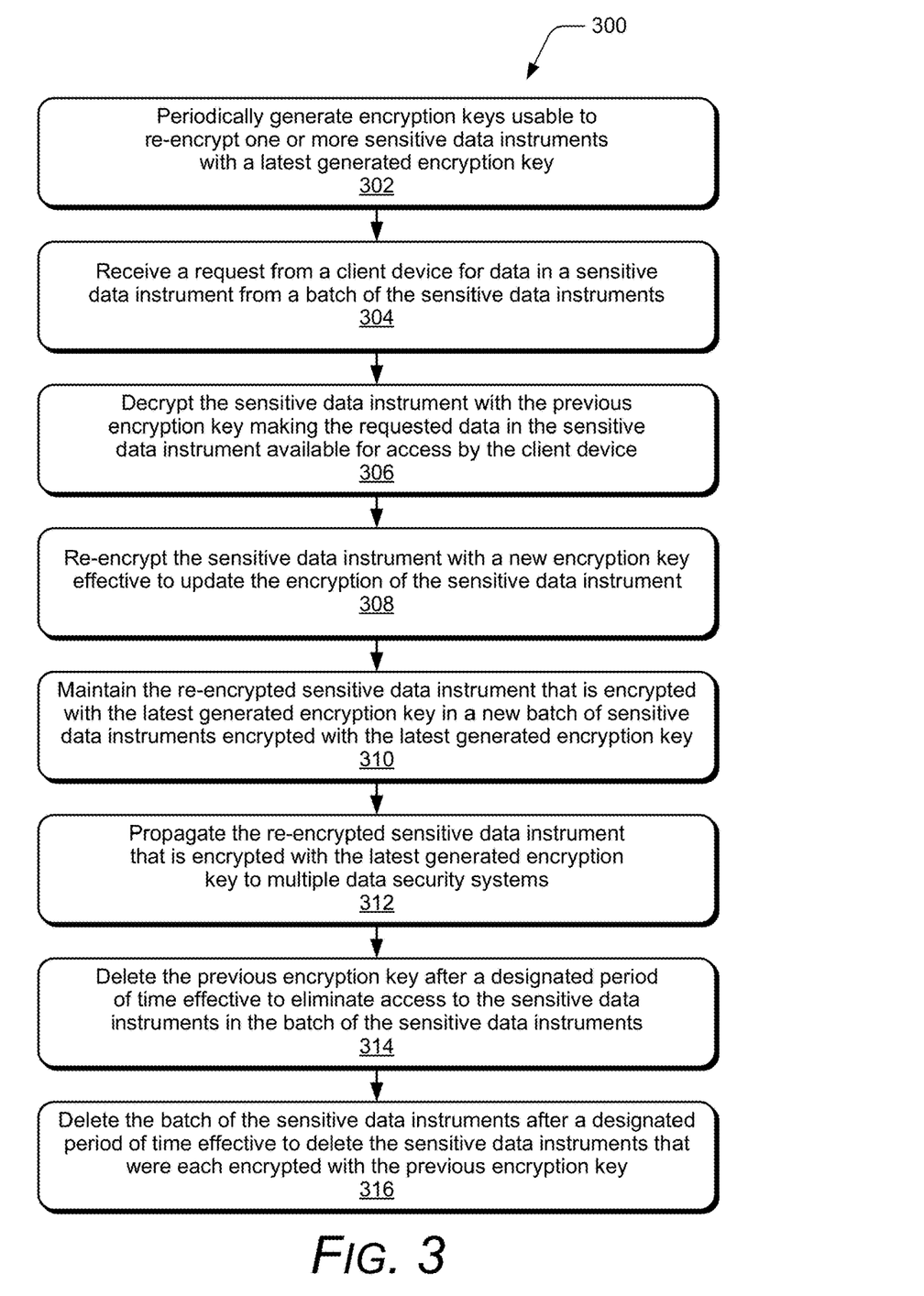
FIG. 3 illustrates an example method of active key rolling for sensitive data protection in accordance with techniques described herein.

FIG. 3 illustrates an example method 300 of active key rolling for sensitive data protection, and is generally described with reference to a service provider that off-loads sensitive data to a data security system for encryption an safe-keeping of the sensitive data. The order in which the method is described is not intended to be construed as a limitation, and any number or combination of the method operations can be performed in any order to implement a method, or an alternate method.

At 302, encryption keys are periodically encrypted, each encryption key being usable to re-encrypt one or more sensitive data instruments with a latest generated encryption key. For example, the key service 116 periodically generates the encryption keys 118 that are usable to encrypt and re-encrypt one or more sensitive data instruments 104 that are decrypted responsive to a data access request for a respective sensitive data instrument. As described herein, a sensitive data instrument 104 may be a transaction instrument and the data requested by the service provider 106 is available for access from the data security system 102 to initiate transaction processing.

At 304, a request is received from a client device for data in a sensitive data instrument from a batch of the sensitive data instruments. For example, the data encryption service 114 at the data security system 102 receives a request from the service provider 106 (e.g., implemented as one or more client computing devices) for sensitive data in the encrypted sensitive data instrument 120 in the batch 124 of the encrypted sensitive data instruments 126. In this instance, the encrypted sensitive data instruments 126 in the batch 124 of the sensitive data instruments 126 have been previously encrypted with a previous encryption key, which is identified by the encryption key handle 128.

At 306, the sensitive data instrument is decrypted with the previous encryption key making the requested data in the sensitive data instrument available for access by the client device. For example, the data encryption service 114 at the data security system 102 uses the encryption key handle 128 to request the corresponding encryption key 118 from the key server 116, and decrypts the previously-encrypted sensitive data instrument 126 that corresponds with the requested data using the previous encryption key. The requested data in the previously-encrypted sensitive data instrument 126 is then available for access by the service provider 106, or to initiate transaction processing, such as to initiate a payment transaction that may be handled by a third-party payment processor on behalf of the service provider 106.

At 308, the sensitive data instrument is re-encrypted with a new encryption key effective to update the encryption of the sensitive data instrument, the updated encryption being triggered based on the request for the data and the decryption of the sensitive data instrument. For example, the data encryption service 114 at the data security system 102 re-encrypts the sensitive data instrument 120 with a new encryption key 134 (e.g., the latest generated encryption key), which updates the encryption of the sensitive data instrument. The updated encryption of the sensitive data instrument 120 is triggered based on the request for the data (at 304) and based on the decryption of the sensitive data instrument (at 306).

At 310, the re-encrypted sensitive data instrument that is encrypted with the latest generated encryption key is maintained in a new batch of sensitive data instruments that are encrypted with the latest generated encryption key. For example, the re-encrypted sensitive data instrument is stored and maintained in the data store 110 at the data security system 102, such as in the batch 130 of the encrypted sensitive data instruments 132, along with the encryption key handle 134 that identifies the particular latest generated encryption key used to encrypt the sensitive data instruments in the batch 130 of the encrypted sensitive data instruments. Additionally, a copy of the previously-encrypted sensitive data instrument remains encrypted with the previous encryption key, which is identified by the encryption key handle 128, and is maintained in the data store 110 in the batch 124 of the encrypted sensitive data instruments 126 that have been encrypted with the previous encryption key.

At 312, the re-encrypted sensitive data instrument that is encrypted with the latest generated encryption key is propagated to multiple data security systems. For example, the data encryption service 114 at the data security system 102 initiates to propagate the re-encrypted sensitive data instrument 132 that is encrypted with the latest generated encryption key, which is identified by the encryption key handle 134, to multiple data security systems, such as in a financial instruments eco-system or environment of card vaults and token service providers.

At 314, the previous encryption key is deleted after a designated period of time effective to eliminate access to the sensitive data instruments in the batch of the sensitive data instruments. For example, the key service 116 at the data security system 102 initiates to delete the previous encryption key, which is identified by the encryption key handle 128, after a designated period of time to eliminate access to the encrypted sensitive data instruments 126 in the batch 124 of the encrypted sensitive data instruments 126. The designated period of time after which the previous encryption key 128 is deleted from the key storage component 210 can be after the re-encrypted sensitive data instrument 132 that is encrypted with the latest encryption key 118 is propagated to the multiple data security systems (at 312).

At 316, the batch of the sensitive data instruments is deleted after a designated period of time effective to delete the sensitive data instruments that were each encrypted with the previous encryption key. For example, the data encryption service 114 at the data security system 102 initiates to delete the batch 124 of the encrypted sensitive data instruments 126 after a designated period of time to delete the encrypted sensitive data instruments 126 that were each encrypted with the previous encryption key, which is identified by the encryption key handle 128. The designated period of time after which the batch 124 of the previously-encrypted sensitive data instruments 126 is deleted can be after the re-encrypted sensitive data instrument 132 that is encrypted with the latest encryption key 118 is propagated to the multiple data security systems (at 312).

Figure 4:
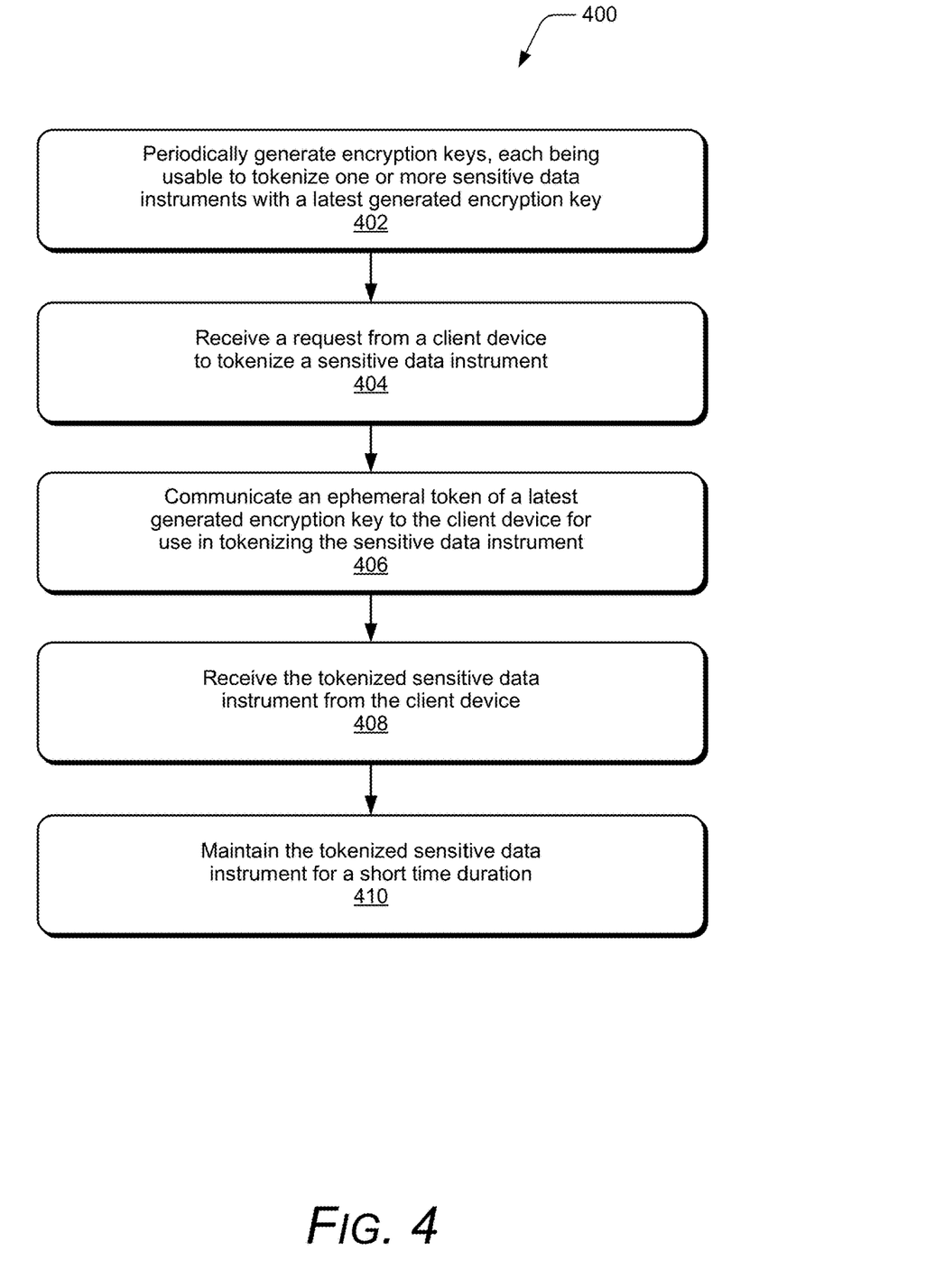
FIG. 4 illustrates an example method of active key rolling for sensitive data protection in accordance with techniques described herein.

FIG. 4 illustrates an example method 400 of active key rolling for sensitive data protection, and is generally described with reference to a client device that requests an ephemeral token from a data security system to tokenize a sensitive data instrument for communication upload to the data security system. The order in which the method is described is not intended to be construed as a limitation, and any number or combination of the method operations can be performed in any order to implement a method, or an alternate method.

At 402, encryption keys are periodically generated, with each encryption key being usable to tokenize one or more sensitive data instruments with a latest generated encryption key. For example, the key service 116 periodically generates the encryption keys 118 that are usable to tokenize one or more sensitive data instruments 204, such as a transaction instrument that is maintained at the data security system 102 for access by a client device 202 to initiate transaction processing.

At 404, a request is received from a client device to tokenize a sensitive data instrument. For example, the data encryption service 114 of the data security system 102 receives a request from the client device 202 to tokenize a sensitive data instrument 204 (e.g., as the received sensitive data 108) at the client device 202, such as if a user of the client device enters a credit card number at the client device, which the client device 202 will then securely upload to the data security system 102.

At 406, an ephemeral token of a latest generated encryption key is communicated to the client device for use in tokenizing the sensitive data instrument. For example, the data security system 102 communicates the ephemeral token 206 of the latest generated encryption key 118 to the client device 202 for use at the client device to tokenize the sensitive data instrument 204.

At 408, the tokenized sensitive data instrument is received from the client device. For example, the data encryption service 114 at the data security system 102 receives the tokenized sensitive data instrument 208 from the client device 202 when the client device uploads the tokenized sensitive data instrument 208 to the data security system 102.

At 410, the tokenized sensitive data instrument is maintained for a short time duration. For example, the data security system 102 temporarily maintains the tokenized sensitive data instrument 208, such as in the data store 110, for a short time duration. The tokenized sensitive data instrument 208 may be a transaction instrument that is available for access with the ephemeral token 206 by the client device 202 to initiate transaction processing for the short time duration.

Figure 5:
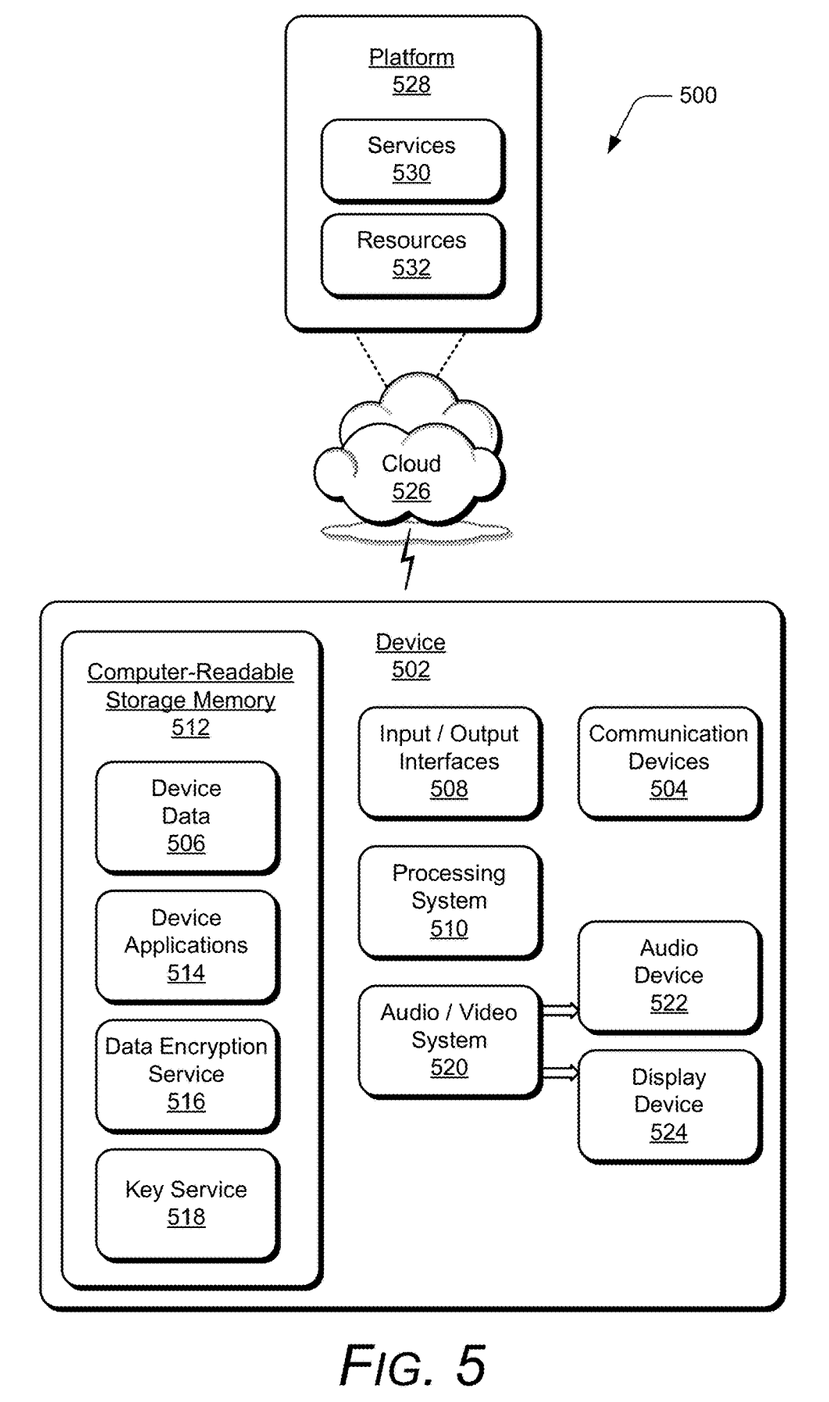
FIG. 5 illustrates an example system with an example device that can implement active key rolling for sensitive data protection as described herein.

FIG. 5 illustrates an example system 500 that includes an example device 502, which can implement aspects of active key rolling for sensitive data protection. The example device 502 can be implemented as any of the computing devices, service systems, and server devices described with reference to the previous FIGS. 1-4. For example, the data security system 102, the service provider 106, and the client device 202 described herein may be implemented as the example device 502 or with one or more components and features of the example device 502.

The device 502 includes communication devices 504 that enable wired and/or wireless communication of device data 506, such as sensitive data, sensitive data instruments, encrypted sensitive data instruments, tokenized sensitive data instruments, generated encryption keys, and ephemeral tokens as described being associated with one or more of the devices. The communication devices 504 can also include transceivers for cellular phone communication and for network data communication.

The device 502 also includes input/output (I/O) interfaces 508, such as data network interfaces that provide connection and/or communication links between the device, data networks, and other devices described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes a computer-readable storage memory 512, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 512 provides storage of the device data 506 and various device applications 514, such as an operating system that is maintained as a software application with the computer-readable storage memory and executed by the processing system 510. In this example, the device applications include a data encryption service 516 and/or a key service 518 that implement embodiments of active key rolling for sensitive data protection, such as when the example device 502 is implemented as the data security system 102 described herein with reference to FIGS. 1-4. An example of the data encryption service 516 and the key service 518 is the data encryption service 114 and the key service 116 implemented at the data security system 102, as shown and described with reference to FIGS. 1 and 2.

The device 502 also includes an audio and/or video system 520 that generates audio data for an audio device 522 and/or generates display data for a display device 524. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device.

In aspects of active key rolling for sensitive data protection, at least part of the techniques described herein may be implemented in a distributed system, such as over a "cloud" 526 in a platform 528. The cloud 526 includes and/or is representative of the platform 528 for services 530 and/or resources 532. The platform 528 abstracts underlying functionality of hardware, such as server devices (e.g., included in the services 530) and/or software resources (e.g., included as the resources 532), and connects the example device 502 with other devices, servers, etc. The resources 532 may also include applications and/or data that can be utilized while computer processing is executed on servers that are remote from the example device 502. Additionally, the services 530 and/or the resources 532 may facilitate subscriber network services, such as over the Internet, a cellular network, or Wi-Fi network. The platform 528 may also serve to abstract and scale resources to service a demand for the resources 532 that are implemented via the platform, such as in an interconnected device embodiment with functionality distributed throughout the system 500. For example, the functionality may be implemented in part at the example device 502 as well as via the platform 528 that abstracts the functionality of the cloud.

Although aspects of active key rolling for sensitive data protection have been described in language specific to features and/or methods, the appended claims are not necessarily limited to the specific features or methods described. Rather, the specific features and methods are disclosed as example implementations of active key rolling for sensitive data protection, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following:

A data security system that implements active key rolling for sensitive data protection, the data security system comprising: memory storage implemented as a data store configured to maintain a batch of sensitive data instruments each encrypted with a previous encryption key; a processing system that implements a data encryption service configured to: receive a request from a client device for data in a sensitive data instrument from the batch of the sensitive data instruments; decrypt the sensitive data instrument with the previous encryption key making the requested data in the sensitive data instrument available for access by the client device; and re-encrypt the sensitive data instrument with a new encryption key effective to update the encryption of the sensitive data instrument, the updated encryption being triggered based on the request for the data and the decryption of the sensitive data instrument.

Alternatively or in addition to the above described data security system, any one or combination of: the sensitive data instruments in the batch of the sensitive data instruments remain encrypted with the previous encryption key after the sensitive data instrument is decrypted and re-encrypted with the new encryption key. The re-encrypted sensitive data instrument is maintained in the data store in a new batch of sensitive data instruments each encrypted with the new encryption key. The sensitive data instrument is a transaction instrument and the requested data is available for access by the client device to initiate transaction processing. A key service is configured to periodically generate encryption keys usable to re-encrypt one or more of the sensitive data instruments in the batch of the sensitive data instruments with a latest generated encryption key as the one or more sensitive data instruments are decrypted responsive to a data access request for a respective sensitive data instrument. A key service configured to periodically generate encryption keys, and wherein the data encryption service is configured to re-encrypt a decrypted sensitive data instrument with a latest generated encryption key. The data encryption service is configured to initiate deletion of the batch of the sensitive data instruments after a designated period of time effective to delete the sensitive data instruments that were each encrypted with the previous encryption key. A key service is configured to initiate deletion of the previous encryption key after a designated period of time effective to eliminate access to the sensitive data instruments in the batch of the sensitive data instruments. The data encryption service is configured to: initiate propagation of the re-encrypted sensitive data instrument to multiple data security systems; and initiate deletion of the sensitive data instrument that was encrypted with the previous encryption key from the multiple data security systems.

A method of active key rolling for sensitive data protection, the method comprising: periodically-generating encryption keys, each encryption key usable to encrypt one or more sensitive data instruments; utilizing the latest generated encryption key for at least one of: receiving a request from a client device to tokenize a sensitive data instrument, the latest generated encryption key being utilized as an ephemeral token to tokenize the sensitive data instrument by the client device; or re-encrypting a previously-encrypted sensitive data instrument with the latest generated encryption key effective to update the encryption of the sensitive data instrument that has been requested by the client device and decrypted with a previous encryption key, making data in the previously-encrypted sensitive data instrument available for access by the client device.

Alternatively or in addition to the above described method, any one or combination of: communicating the ephemeral token of the latest generated encryption key to the client device; and receiving the tokenized sensitive data instrument from the client device. The method further comprising receiving a request from the client device for the data in the previously-encrypted sensitive data instrument; and decrypting the previously-encrypted sensitive data instrument with the previous encryption key, making the requested data available for access by the client device. The re-encrypting the previously-encrypted sensitive data instrument with the latest generated encryption key being triggered based on the request for the data and the decrypting of the previously-encrypted sensitive data instrument. The previously-encrypted sensitive data instrument is a transaction instrument and the requested data is available for access by the client device to initiate transaction processing. A copy of the previously-encrypted sensitive data instrument remains encrypted with a previous encryption key; the copy of the previously-encrypted sensitive data instrument is maintained in a batch of sensitive data instruments that have been encrypted with the previous encryption key; and the re-encrypted sensitive data instrument that is encrypted with the latest generated encryption key is maintained in a new batch of sensitive data instruments that are encrypted with the latest generated encryption key. The method further comprising deleting the batch of the sensitive data instruments after a designated period of time effective to delete the sensitive data instruments that were each encrypted with the previous encryption key; and deleting the previous encryption key after the designated period of time effective to eliminate access to the sensitive data instruments in the batch of the sensitive data instruments. The method further comprising propagating the re-encrypted sensitive data instrument that is encrypted with the latest generated encryption key to multiple data security systems; and deleting the previously-encrypted sensitive data instrument that was encrypted with the previous encryption key.

A method of active key rolling for sensitive data protection, the method comprising: periodically-generating encryption keys, each encryption key usable to tokenize one or more sensitive data instruments; receiving a request from a client device to tokenize a sensitive data instrument; communicating an ephemeral token of a latest generated encryption key to the client device for use to said tokenize the sensitive data instrument; and receiving the tokenized sensitive data instrument from the client device.

Alternatively or in addition to the above described method, any one or combination of: the tokenized sensitive data instrument is a transaction instrument that is available for access with the ephemeral token by the client device to initiate transaction processing. The method further comprising receiving a request from the client device for data in an encrypted sensitive data instrument; decrypting the encrypted sensitive data instrument with a previous encryption key, making the requested data available for access by the client device; and re-encrypting the encrypted sensitive data instrument with a subsequent latest generated encryption key effective to update the encryption of the encrypted sensitive data instrument.

The invention claimed is:

1. A data security system that implements active key rolling for sensitive data protection, the data security system comprising:
   memory storage implemented as a data store configured to maintain sensitive data encrypted with a first encryption key in a time series of encryption keys;
   a processing system that implements a data encryption service configured to:
      automatically transition a second encryption key in the time series of encryption keys from a dormant state to an active state in response to expiration of a timer associated with the second encryption key;
      automatically transition the first encryption key from the active state to a read-only state in response to the transition of the second encryption key from the dormant state to the active state;
      receive a request from a client device for data in the sensitive data;
      decrypt the sensitive data with the first encryption key making the requested data in the sensitive data available for access by the client device; and
      re-encrypt the sensitive data with the second encryption key effective to update the encryption of the sensitive data, the updated encryption being triggered based on the request for the data and the decryption of the sensitive data.

2. The data security system as recited in claim 1, wherein the sensitive data remain encrypted with the first encryption key after the sensitive data is decrypted and re encrypted with the second encryption key.

3. The data security system as recited in claim 1, wherein the re-encrypted sensitive data is maintained in the data store encrypted with the second encryption key.

4. The data security system as recited in claim 1, wherein the sensitive data is a transaction instrument and the requested data is available for access by the client device to initiate transaction processing.

5. The data security system as recited in claim 1, further comprising a key service configured to periodically generate encryption keys usable to re-encrypt the sensitive data with a latest generated encryption key as the sensitive data is decrypted responsive to a data access request therefor.

6. The data security system as recited in claim 1, further comprising a key service configured to periodically generate encryption keys, and wherein the data encryption service is configured to re-encrypt the decrypted sensitive data with a latest generated encryption key.

7. The data security system as recited in claim 1, wherein the data encryption service is configured to initiate deletion of the sensitive data after a designated period of time effective to delete the sensitive data that was encrypted with the first encryption key.

8. The data security system as recited in claim 1, wherein a key service is configured to initiate deletion of the first encryption key after a designated period of time effective to eliminate access to the sensitive data.

9. The data security system as recited in claim 1, wherein the data encryption service is configured to:
initiate propagation of the re-encrypted sensitive data to multiple data security systems; and
initiate deletion of the sensitive data that was encrypted with the first encryption key from the multiple data security systems.

10. A method of active key rolling for sensitive data protection, the method comprising:
periodically-generating encryption keys, each encryption key being transitioned over time from a dormant state, in which the encryption key is not used for encrypting or decrypting any sensitive data, to an active state, in which the encryption key is used for both encrypting and decrypting sensitive data, to a read-only state, in which the encryption key is only used for decrypting sensitive data, the encryption key being transitioned from the active state to the read-only state responsive to the transition of a subsequently-generated encryption key from the dormant state to the active state, the transition of the subsequently-generated encryption key from the dormant state to the active state occurring automatically in response to expiration of a timer associated with the subsequently-generated encryption key;
utilizing a latest generated active encryption key for at least one of:
receiving a request from a client device to tokenize sensitive data, the latest generated active encryption key being utilized as an ephemeral token to tokenize the sensitive data by the client device; or
re-encrypting previously-encrypted sensitive data with the latest generated active encryption key effective to update the encryption of the sensitive data that has been requested by the client device and decrypted with a previous encryption key, making data in the previously-encrypted sensitive data available for access by the client device.

11. The method as recited in claim 10, wherein the latest generated active encryption is utilized for receiving the request from a client device to tokenize the sensitive data, the latest generated active encryption key being utilized as the ephemeral token to tokenize the sensitive date by the client device, the method further comprising:
communicating the ephemeral token of the latest generated active encryption key to the client device; and
receiving the tokenized sensitive data from the client device.

12. The method as recited in claim 10, further comprising:
receiving a request from the client device for the data in the previously-encrypted sensitive data; and
decrypting the previously-encrypted sensitive data with the previous encryption key, making the requested data available for access by the client device.

13. The method as recited in claim 12, wherein said re-encrypting the previously-encrypted sensitive data with the latest generated active encryption key being triggered based on the request for the data and the decrypting of the previously-encrypted sensitive data.

14. The method as recited in claim 10, wherein the previously-encrypted sensitive data is a transaction instrument and the requested data is available for access by the client device to initiate transaction processing.

15. The method as recited in claim 10, wherein:
a copy of the previously-encrypted sensitive data remains encrypted with a previous encryption key; and
the re-encrypted sensitive data is encrypted with the latest generated active encryption key.

16. The method as recited in claim 15, further comprising:
deleting the sensitive data after a designated period of time effective to delete the sensitive data that was encrypted with the previous encryption key; and
deleting the previous encryption key after the designated period of time effective to eliminate access to the sensitive data.

17. The method as recited in claim 10, further comprising:
propagating the re-encrypted sensitive data that is encrypted with the latest generated active encryption key to multiple data security systems; and
deleting the previously-encrypted sensitive data that was encrypted with the previous encryption key.

18. A method of active key rolling for sensitive data protection, the method comprising:
periodically-generating encryption keys, each encryption key being transitioned over time from a dormant state, in which the encryption key is not used to tokenize or decrypt any sensitive data, to an active state, in which the encryption key is used to tokenize and decrypt sensitive data, to a read-only state, in which the encryption key is only used to decrypt sensitive data, the encryption key being transitioned from the active state to the read-only state responsive to the transition of a subsequently-generated encryption key from the dormant state to the active state, the transition of the subsequently-generated encryption key from the dormant state to the active state occurring automatically in response to the expiration of a timer associated with the subsequently-generated encryption key;
receiving a request from a client device to tokenize sensitive data;
communicating a latest generated active encryption key to the client device for use to tokenize the sensitive data; and receiving the tokenized sensitive data from the client device.

19. The method as recited in claim 18, wherein the tokenized sensitive data is a transaction instrument that is available for access with the ephemeral token by the client device to initiate transaction processing.

20. The method as recited in claim 18, further comprising:
receiving a request from the client device for data in encrypted sensitive data;
decrypting the encrypted sensitive data with a previous encryption key, making the requested data available for access by the client device; and
re-encrypting the encrypted sensitive data with a subsequent latest generated active encryption key effective to update the encryption of the encrypted sensitive data.

* * * * *